P. W. BRUBAKER.
GEAR SHIFT LEVER DEVICE.
APPLICATION FILED MAR. 18, 1912.

1,057,524.

Patented Apr. 1, 1913.

Witnesses
A. Van Loock
C. M. Gibson

Inventor
Phares W. Brubaker,
By
T. Lloyd Kochabee
Attorney

UNITED STATES PATENT OFFICE.

PHARES W. BRUBAKER, OF WEST READING, PENNSYLVANIA.

GEAR-SHIFT-LEVER DEVICE.

1,057,524. Specification of Letters Patent. Patented Apr. 1, 1913.

Application filed March 18, 1912. Serial No. 684,580.

*To all whom it may concern:*

Be it known that I, PHARES W. BRU-BAKER, a citizen of the United States, residing at West Reading, in the county of Berks and State of Pennsylvania, have invented certain new and useful Improvements in Gear-Shift-Lever Devices, of which the following is a specification.

My invention relates to lever locking devices and is particularly adapted for use in connection with an automobile gear shift lever.

The object of the present invention is to provide a device of this character which may be easily and quickly operated from neutral to different speeds and reverse, and when desired may be conveniently locked.

With this and other objects in view, my invention consists of a lever movable within a slot and engaging a stationary element therein, a spring adapted to bear against said lever so as to maintain such engagement, a pivoted latch engaging the spring and a lock for holding said latch in its engaged position.

It is obvious that the construction shown in the accompanying drawings and herein described and claimed, may be varied to suit special conditions and it is therefore understood that I do not limit myself to the specific details disclosed, but reserve the right to make such changes as fall within the limit and scope of the appended claims.

Figure 1:
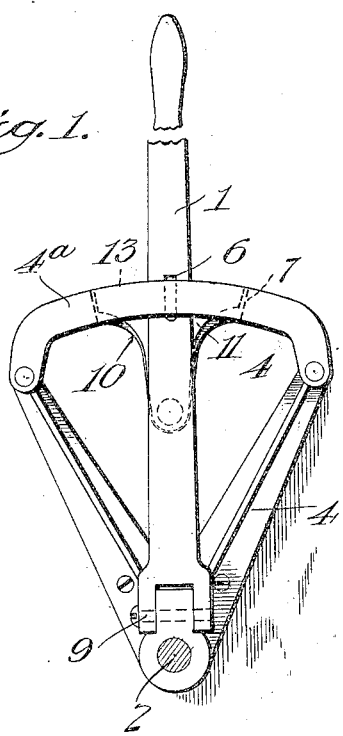
Figure 3:
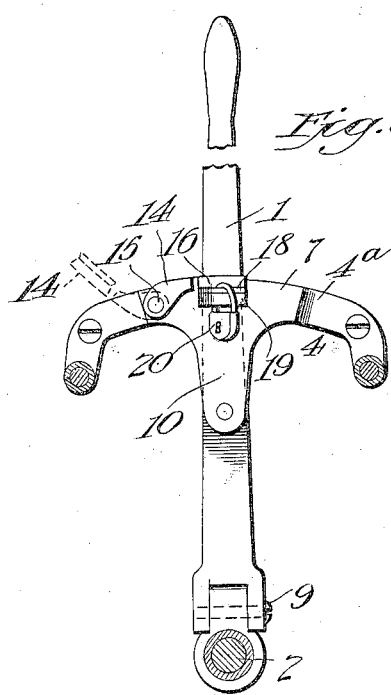
Figure 2:
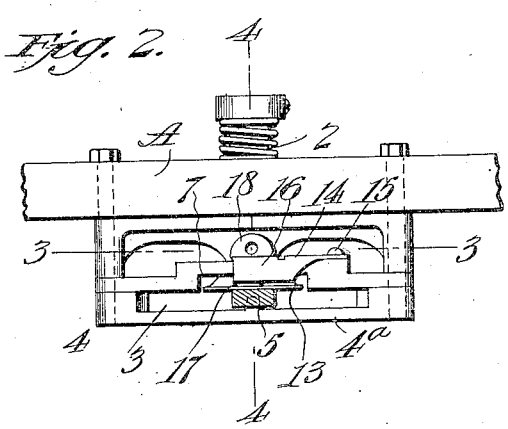
Figure 4:
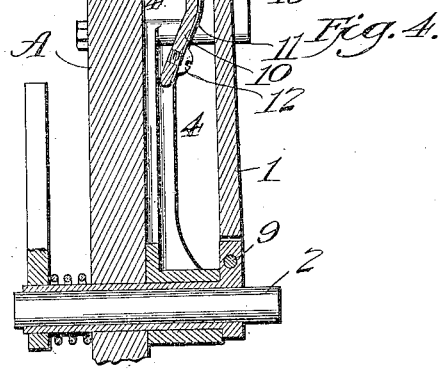
Figure 5:
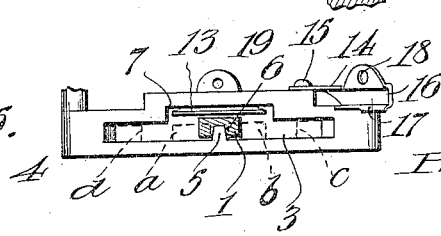

Referring to the drawings:—Figure 1 is a side elevation of my invention. Fig. 2 is a top plan view of the same showing the lever in a locked position. Fig. 3 is a section on the line 3—3 of Fig. 2. Fig. 4 is a section on the line 4—4 of Fig. 2. Fig. 5 is a plan view with the pivoted latch disengaged.

Referring more particularly to the drawings, like characters of reference designate similar parts throughout the several views.

In the practical embodiment of my invention, the shift lever 1 is mounted in any usual manner, as upon a short shaft 2, so that it may be freely moved within the slot 3 provided in the casting 4 secured to the side A of an automobile or the like.

While the device is shown and described in connection with an automobile, it is of course obvious that there are numerous uses to which it may be put, an automobile being used as a convenient means of explaining its operation and advantages.

The slot 3 is preferably of elongated form and of such width as to permit of the lever 1 having free movement therein to allow the said lever to be moved to any position desired, in order to shift from one speed to another, obtain neutral position or reverse. The casting in which the slot is formed is provided with a lug or projection 5, extending within said slot at about the central portion thereof, and this lug or projection is adapted to engage a notch or opening 6 provided in the lever 1. In order that there may be sufficient room for the movement of the lever in engaging or disengaging from the lug 5, the slot 3 is formed with an offset portion 7 which provides space for the free movement of the lever. At a point above the shaft 2, the lever is provided with a hinged joint 9, said joint permitting said lever to be freely moved in a direction transverse of the slot 3. As before stated, the slot 3 is formed in a casting 4, and in the present instance is shown as formed in the upper portion 4$^a$ of said casting. Projecting downwardly from the portion 4$^a$, just mentioned, is an arm or projection 10, provided for the purpose of supporting a flat spring 11, the said spring being secured thereto as at 12. The spring 11 is of substantially the same form as the projection 10, being formed with an upper enlarged portion 13 which is adapted to bear against the lever 1 and hold it in engagement with the lug 5. The said spring also forms a flexible wall for one side of the slot 3. Pivotally mounted upon the casting 4 in juxtaposition to the slot 3 is a latch 14, the pivot of said latch being shown at 15. The latch 14 is formed with a raised portion 16 adapted to engage the offset portion 7 of the slot 3, and when so engaged the projecting end 17 of said latch bears against the enlarged portion 13 of the spring 11, and when the lever 1 is engaged by the lug 5 holds said lever in such engagement. In order that the latch 14 may be kept in the position just described, an apertured lug 18 is formed on the latch, said lug being adapted to engage a similar lug 19 formed on the casting 4, both of said lugs being locked in position by a padlock or other device 20, as shown in Fig. 3.

When it is desired to move the lever from neutral position in which it is shown, it is only necessary to remove the lock and raise the latch to the position shown in Fig. 5, when the spring will yield and permit the free movement of said lever. In Fig. 5, there is also shown several positions of the lever, the full line position being neutral, the other positions being shown by dotted lines, *a* being first speed, *b* second speed, *c* third speed, and *d* the reverse.

From the foregoing, it will be seen that I provide a simple and efficient control for a speed shift lever, it being positive of operation and the parts being so arranged as to be easily manipulated.

Having thus described my invention, what I claim is:—

1. The combination of a movable controller, a fixed element with which the controller is adapted to engage, means for yieldingly maintaining such engagement, and additional means adjustable to and from a position for positively maintaining the controller engaged with the said element.

2. A lever working within a slot, said slot being provided with an offset portion, a spring movable within said offset portion, and a locking element engaging said spring.

3. A lever working within a slot, a lug projecting within said slot, a notch provided in said lever, a spring adapted to bear against said lever, a pivoted latch engaging said spring, and means for locking said pivoted latch.

4. A lever working within a slot, one side of said slot being provided with a flexible portion, and means for converting said flexible portion into a rigid portion.

5. A lever working within a slot, one side of said slot being provided with a flexible portion, means for converting said flexible portion into a rigid portion, and means whereby said flexible portion controls the movement of said lever.

6. A lever working within a slot, a portion of one wall being flexible, a lug located within said slot opposite to said flexible portion, and a latch coacting with said flexible portion.

7. A lever working within a slot, said slot being provided with an offset portion, a spring located within said offset portion, a lug projecting within the slot, and a pivoted latch provided with a projection adapted to engage said spring.

8. The combination of a lever, a fixed element with which the lever is adapted to be engaged, a spring for yieldingly holding the lever engaged with the said element, and a device movable into engagement with the spring for preventing yielding thereof and disengagement of the lever from the said element.

9. The combination of a lever-holding element, a spring adjacent the same, a lever movable past and between the element and spring and adapted when in neutral position to be held by the spring in engagement with said element, said spring being yieldable away from the said element to permit the lever to be released, and a device movable into engagement with the spring to prevent yielding thereof.

In testimony whereof I affix my signature in presence of two witnesses.

PHARES W. BRUBAKER.

Witnesses:
LILLIE M. FRY,
H. FRANKLIN BROSSMAN.

---

Copies of this patent may be obtained for five cents each, by addressing the "Commissioner of Patents, Washington, D. C."